US 6,625,831 B2

(12) United States Patent
Laughlin

(10) Patent No.: US 6,625,831 B2
(45) Date of Patent: Sep. 30, 2003

(54) MEDICAL POSITIONER AND METHOD FOR ITS MANUFACTURE

(76) Inventor: Kevin Laughlin, 3559 Gordon Rd., Elkhart, IN (US) 46516

(*) Notice: Subject to any disclaimer, the term of this patent is extended or adjusted under 35 U.S.C. 154(b) by 34 days.

(21) Appl. No.: 09/750,472

(22) Filed: Dec. 28, 2000

(65) Prior Publication Data

US 2001/0005779 A1 Jun. 28, 2001

Related U.S. Application Data

(63) Continuation-in-part of application No. 09/190,646, filed on Nov. 12, 1998, now Pat. No. 6,190,487.
(60) Provisional application No. 60/065,829, filed on Nov. 17, 1997.

(51) Int. Cl.[7] .............................................. A47C 16/00
(52) U.S. Cl. ........................ 5/655.9; 5/621; 5/630; 5/636; 5/737; 128/845
(58) Field of Search ............................ 5/655.9, 622, 621, 5/636, 630, 737; 128/845

(56) References Cited

U.S. PATENT DOCUMENTS

| 3,574,397 | A | * | 4/1971 | Norriss ....................... 297/391 |
| 3,849,225 | A | | 11/1974 | Haertle |
| 3,995,846 | A | * | 12/1976 | Frick .............................. 5/646 |
| 4,710,991 | A | * | 12/1987 | Wilmore et al. ................ 5/637 |
| 4,726,624 | A | * | 2/1988 | Jay ........................ 297/452.23 |
| 4,736,477 | A | * | 4/1988 | Moore ......................... 128/892 |
| 5,108,529 | A | | 4/1992 | Shuert |
| 5,140,713 | A | * | 8/1992 | Pesterfield ................... 4/575.1 |
| 5,214,815 | A | * | 6/1993 | Agbodoe et al. ............... 5/622 |
| 5,269,322 | A | * | 12/1993 | Mandel ....................... 128/845 |
| 5,566,681 | A | * | 10/1996 | Manwaring et al. ......... 128/845 |
| 5,743,979 | A | | 4/1998 | Lorbiecki |
| 5,836,024 | A | * | 11/1998 | Uglehus et al. ................ 5/636 |
| 5,893,183 | A | * | 4/1999 | Bechtold, Jr. ............... 128/845 |
| 6,027,777 | A | * | 2/2000 | Hirano et al. ................ 428/137 |
| 6,095,894 | A | * | 8/2000 | Stevens ........................ 450/57 |
| 6,190,487 | B1 | * | 2/2001 | Laughlin ..................... 156/212 |

* cited by examiner

Primary Examiner—J. J. Swann
Assistant Examiner—Katherine W Mitchell
(74) Attorney, Agent, or Firm—Baker & Daniels

(57) ABSTRACT

A ring shaped medical positioner and method for its manufacture the positioner includes a ring shaped insert wrapped in a surgical vinyl. The vinyl is divided into a first and second pieces, the first piece being formed by forming dyes engaging opposite sides of the vinyl, which is stretched between the dyes and progressively relaxed as the material is drawn into the female forming dye by the male dye and suction. The insert is placed within the formed surgical vinyl. The second piece is a flat disc which is placed over one of the surfaces of the insert and sealed to the edges of the first piece of vinyl to thereby provide a wrinkle free covering which may be easily disinfected for repeated use.

20 Claims, 12 Drawing Sheets

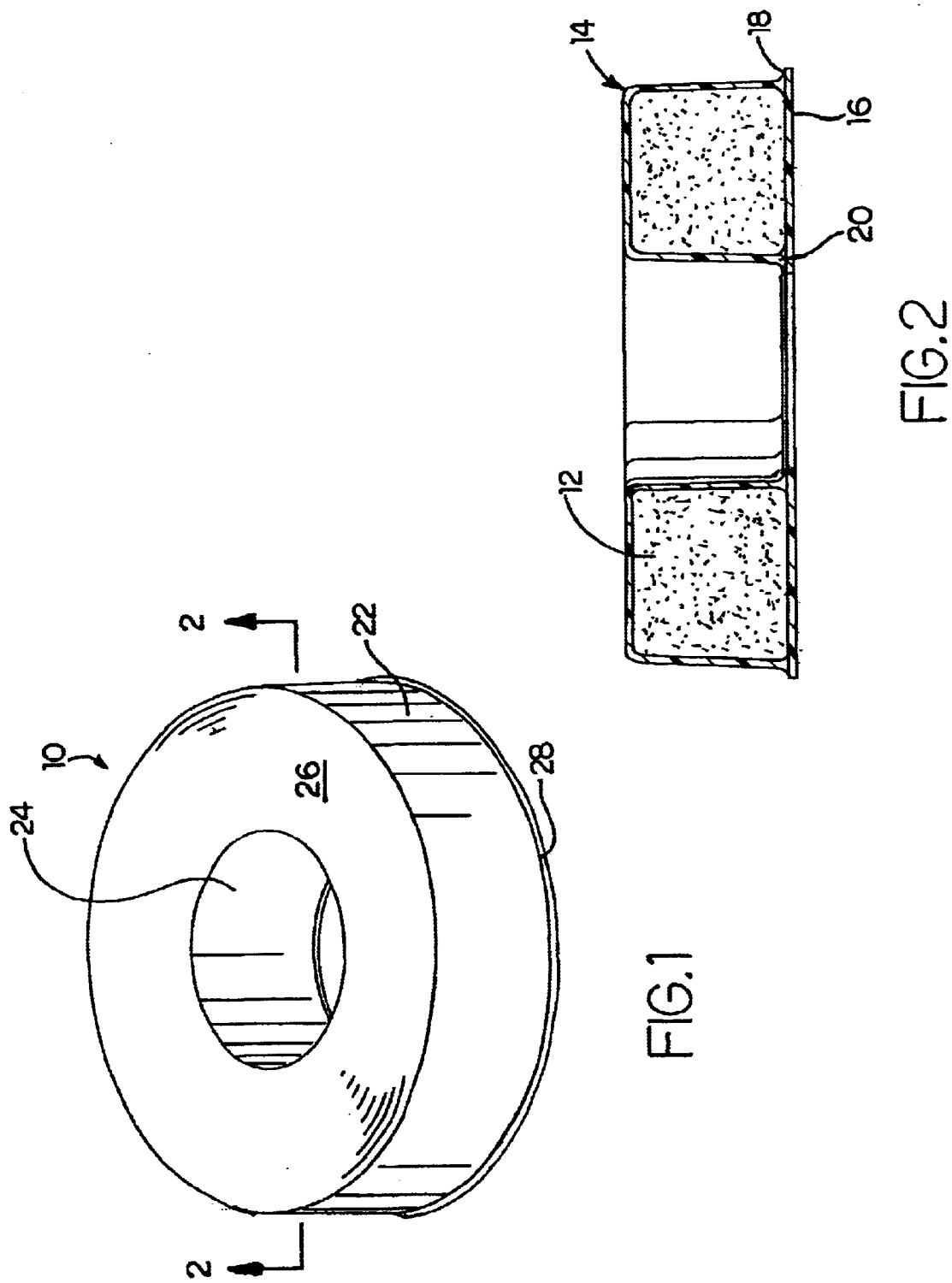

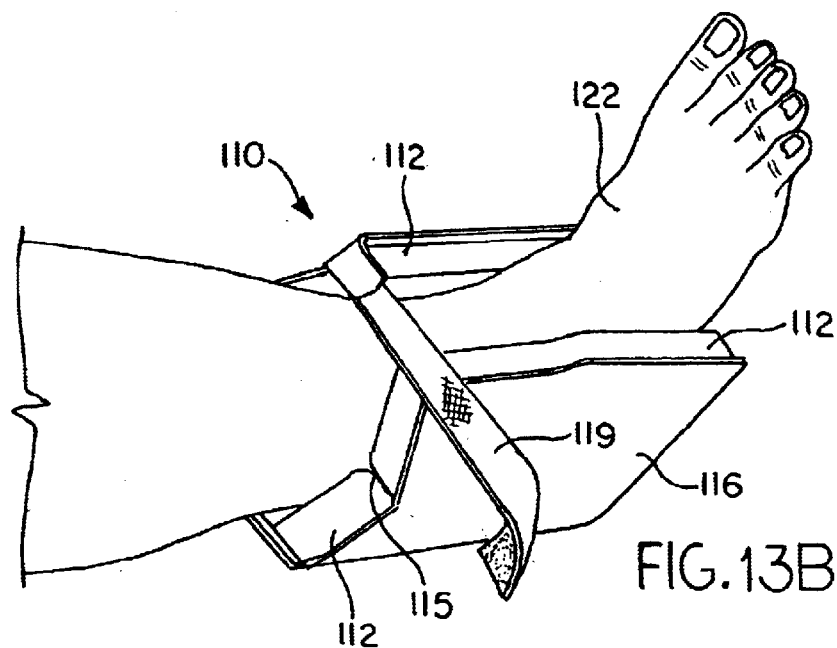
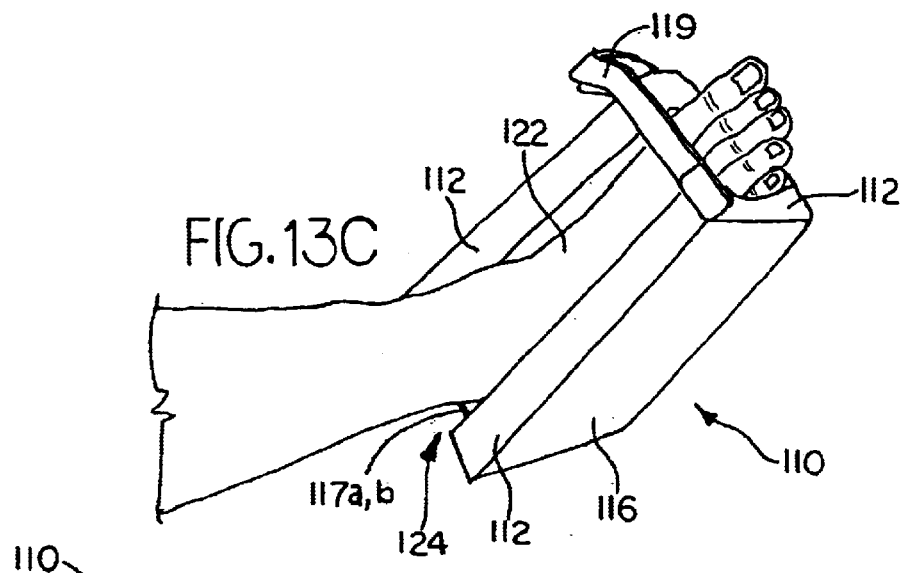
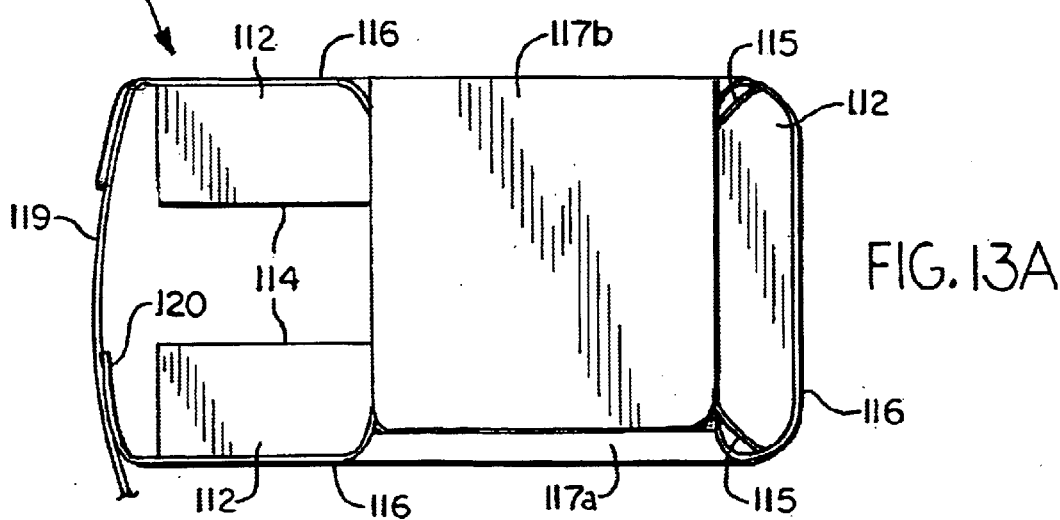

MEDICAL POSITIONER AND METHOD FOR ITS MANUFACTURE

BACKGROUND OF THE INVENTION

1. Field of the Invention

This invention relates to a reusable surgical positioner for supporting body members during surgery, and to a process encasing a polyurethane insert in medical grade vinyl by thermal vacuum forming the vinyl, installing the insert in the vinyl, and sealing the vinyl around the insert to provide a product for reusable use in various health care venues such as surgery.

2. Discussion of the Prior Art

Surgical positioners are used to position, support and prevent injury to the human body for patients undergoing surgery. These positioners are commonly made out of polyurethane foam, and are discarded after use. For example, donut shaped positioners are used to position the head of a patient during surgery in some procedures, and then discarded.

SUMMARY OF THE INVENTION

Such positioners are discarded because it is impossible to insure that the positioner is properly cleaned after use. In order to insure a clean and sterile environment, the foam positioner must be encapsulated in a surgical vinyl, which may be cleaned and disinfected for reuse. Of course, the vinyl cannot be sewn or otherwise attached by processes that punch holes in the vinyl because holes provide areas where bacteria may be lodged and where it is difficult or impossible to clean and disinfect. Prior art positioners using gel filled surgical vinyl are available, but these have proven to be unsatisfactory because the gel conducts heat. Since operating rooms are maintained at a relatively low temperature (usually about 62° F.), the gel filled positioners remain at this temperature, thus draining heat from the patient and retarding circulation in that portion of the body where the positioner is used. Polyurethane foam has heretofore not been covered with surgical vinyl because of difficulties in applying the vinyl to the polyurethane foam in a manner such that wrinkles, creases, etc. in the vinyl covering polyurethane foam, which may harbor harmful bacteria, are eliminated. The present invention relates to a surgical positioner and a method for its manufacture, in which surgical vinyl encapsulates a deformable material such as polyurethane foam or foam rubber in a manner in which creases, wrinkles, etc. are eliminated and heat sealing is used to provide a seam that is resistant or impenetrable to bacteria and so that sewing, and the resulting needle holes, are eliminated. Accordingly, the positioner can be used repeatedly and disinfected after each use in the same manner in which other operating room appliances are disinfected, that is, by wiping with a cleaning pad which has been dipped in disinfectant.

These and other advantages of the present invention will become apparent from the following description with reference to the accompanying drawings in which:

BRIEF DESCRIPTION OF THE DRAWINGS

FIG. 1 is a view in perspective of a surgical positioner typical of the type manufactured by the process disclosed herein;

FIG. 2 is a cross sectional view taken substantially along lines 2—2 of FIG. 1;

FIG. 13A is a rear view of the surgical positioner of FIG. 13 shown with the hook & loop straps and tabs fastened.

FIG. 13B is a perspective view of the surgical positioner of FIG. 13 shown in a first manner of use protecting a patient's foot and ankle.

FIG. 13C is a perspective view of the surgical positioner of FIG. 13 shown in an alternative manner of use protecting a patient's foot and ankle.

DETAILED DESCRIPTION OF THE PREFERRED EMBODIMENT

Figure 3:
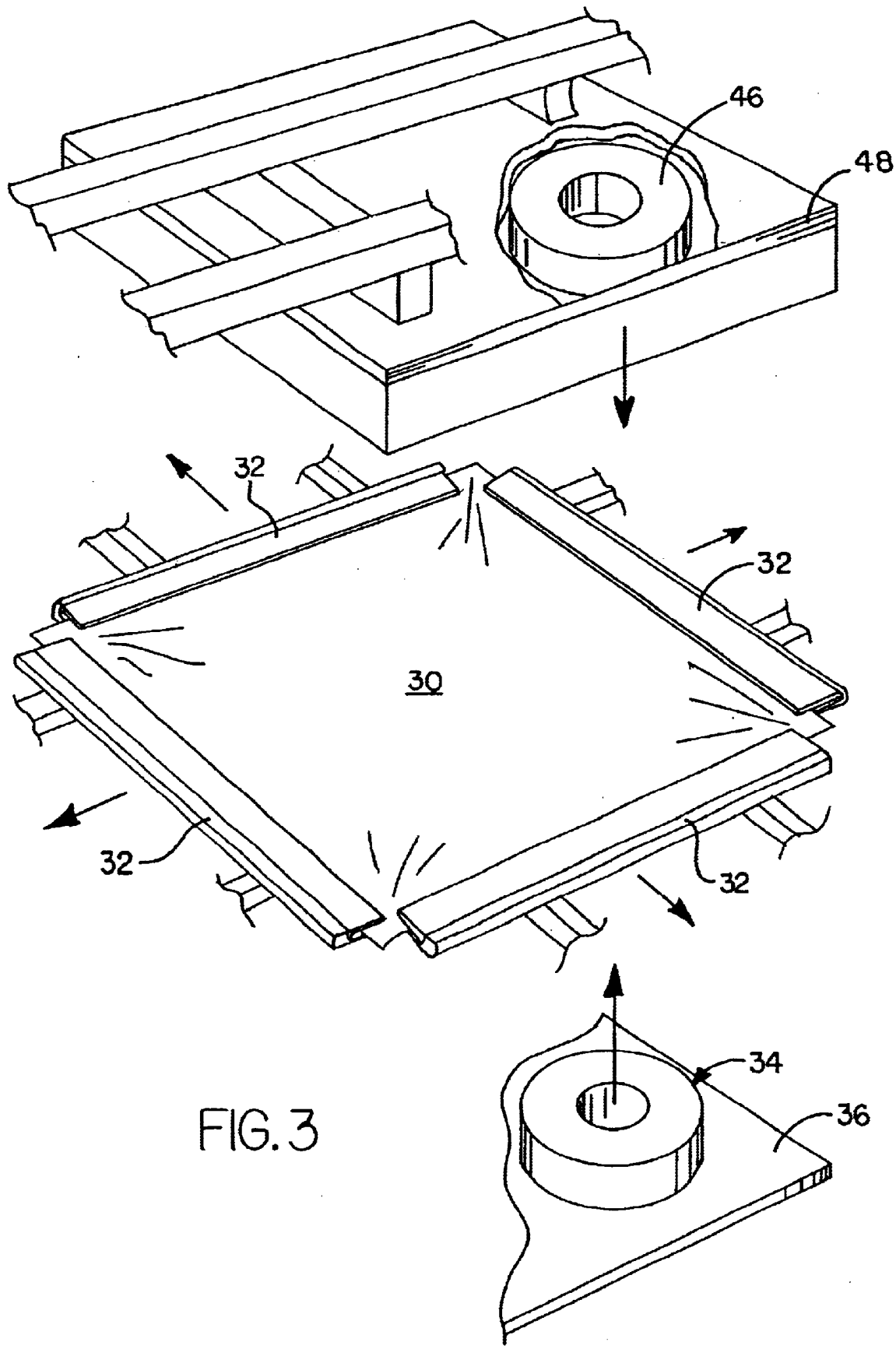
FIG. 3 is an exploded view in perspective of a molding press and blank of surgical vinyl illustrating the manner in which one portion of the vinyl is formed into a shape for encapsulating a foam rubber ring.
Figure 4:
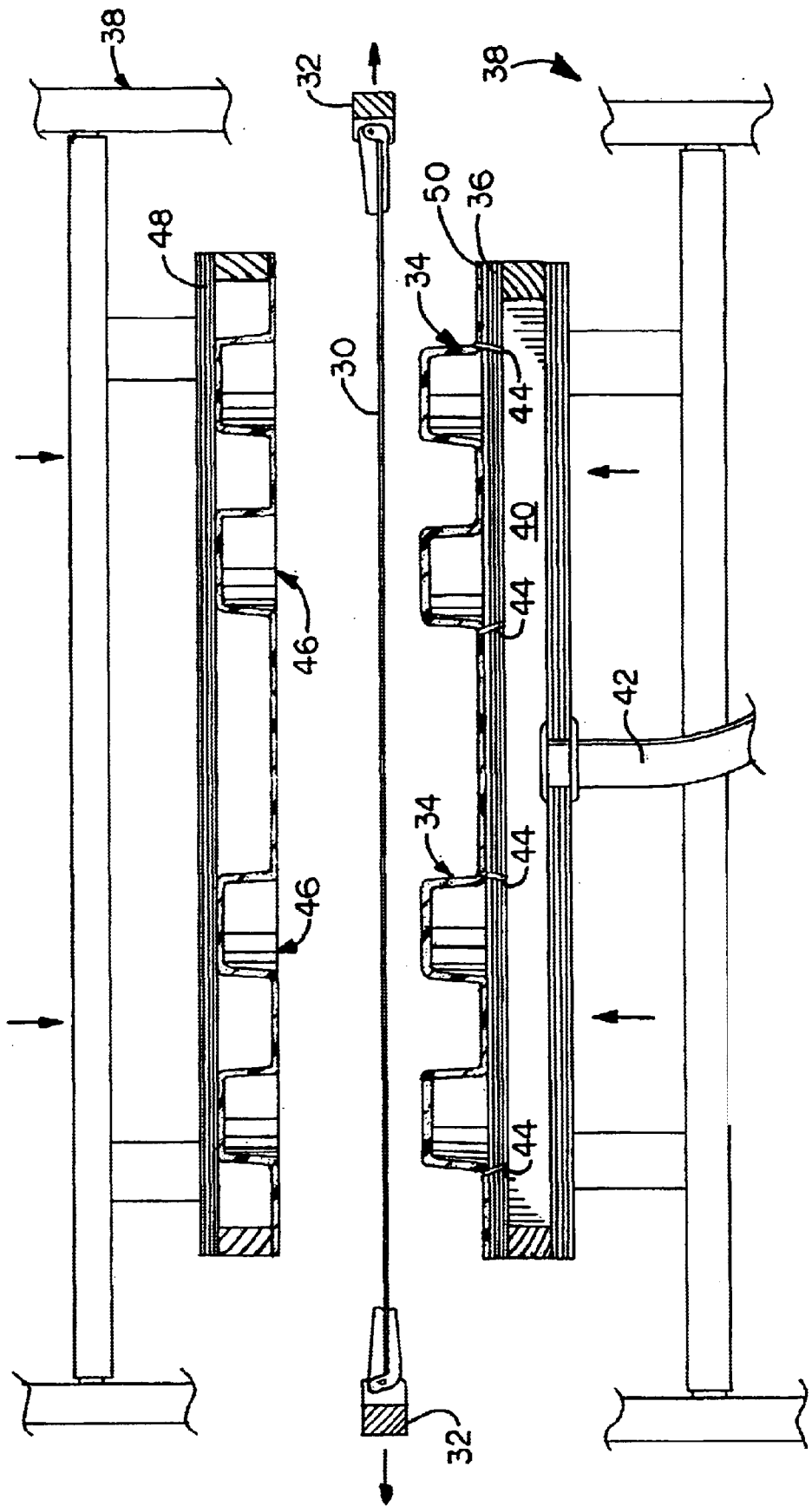
FIG. 4 is cross sectional view of the press illustrated in FIG. 3, the press being shown with the jaws open and the vinyl blank disposed between the jaws.

Referring now to the drawings, a surgical positioner is generally indicated by the numeral 10 and includes an annular ring or mass of polyurethane foam/foam rubber or other derformable material generally indicated by the numeral 12 which is covered by a covering or overlay of elastic surgical vinyl or other suitable material which may be treated to be bacterially resistant consisting of a contoured section 14 that is sealed against a substantially flat portion of surgical vinyl 16. The portions 14 and 16 are sealed to each other around the outer juncture 18 between the members 14 and 16 and also around the inner juncture 20. Accordingly, the positioner 10 includes an outer circumferential surface 22, an inner circumferential surface 24, an upper transverse surface 26, and a lower transverse surface 28. The ring of foam rubber 12 maybe formed in any manner well known to those skilled in the art. The surgical vinyl covering is a thermal formable, polyester backed commercial grade stretchable vinyl, obtainable from Uniroyal, Inc., to which common antibacterial agents have been added.

Referring now to FIGS. 3–6, a blank 30 of the aforementioned surgical vinyl that is to be formed into the upper contoured vinyl member 14 is clamped along its edges by movable clamps 32, through which tension is applied to the blank 30, thereby stretching the blank 30 to a size approximately thirty percent (30%) larger than the nominal size. The blank 30 is sufficiently large that multiple copies of the upper contour member 14 will be formed in a single blank; for example, the blank 30 as illustrated is large enough that four copies of the upper contoured member 14 are formed simultaneously.

The blank 30 is stretched between a male die forming member indicated by the numeral 34 which is mounted on lower platen 36 of a press generally indicated by the numeral 38. The lower platen 36 includes a plenum 40 which is connected to a vacuum source (not shown) through vacuum hose 42. The male die forming members 34 are circumscribed by passages 44 that communicate with the plenum 40. Female die members 46 are mounted on upper platen 48 and are adapted to receive the male die member 34 to thereby form the blank 30 into copies of the upper contoured vinyl member 14.

Figure 5:
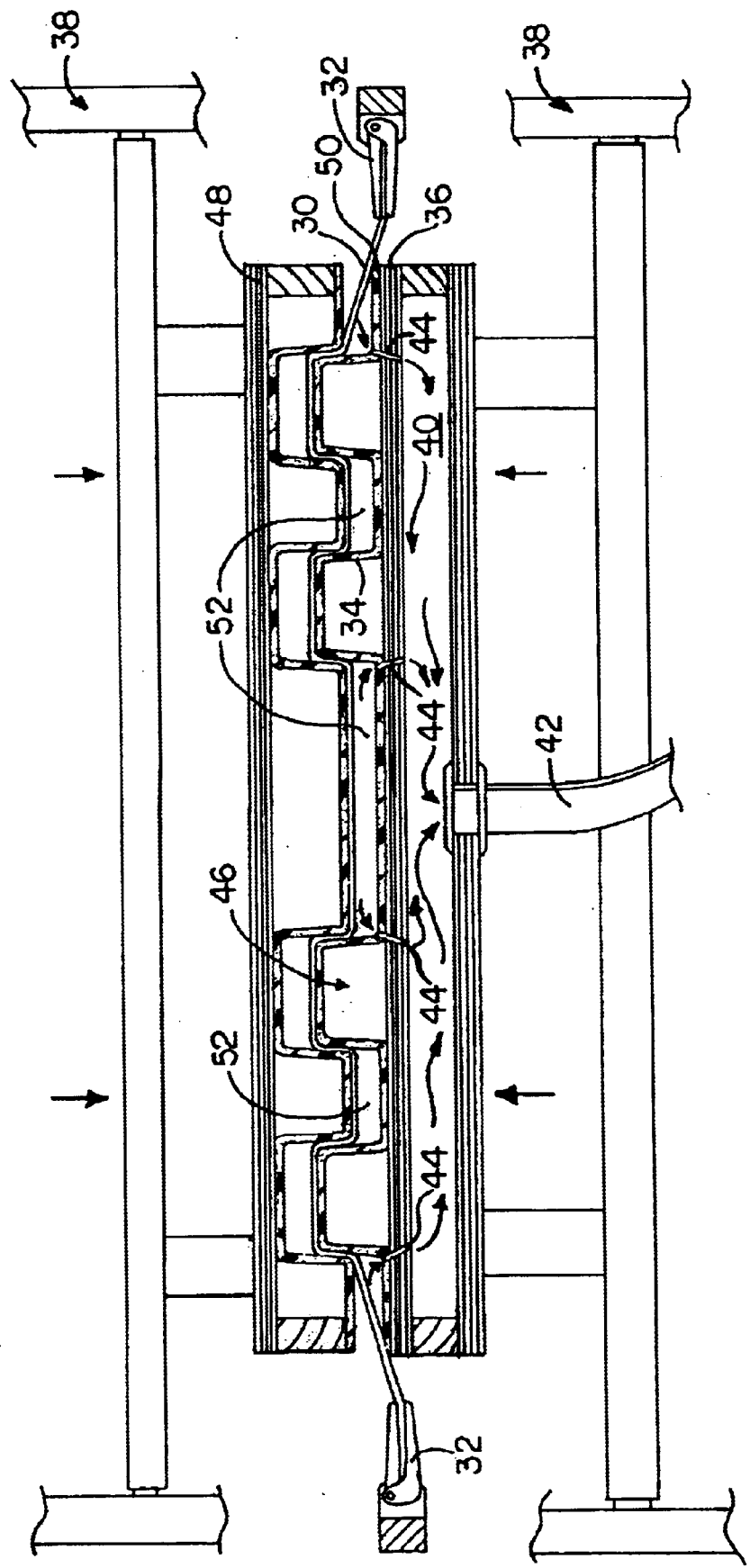
FIG. 5 is a view similar to FIG. 4, but illustrating the platens of the press in a position in which molding of the vinyl is initiated.
Figure 6:
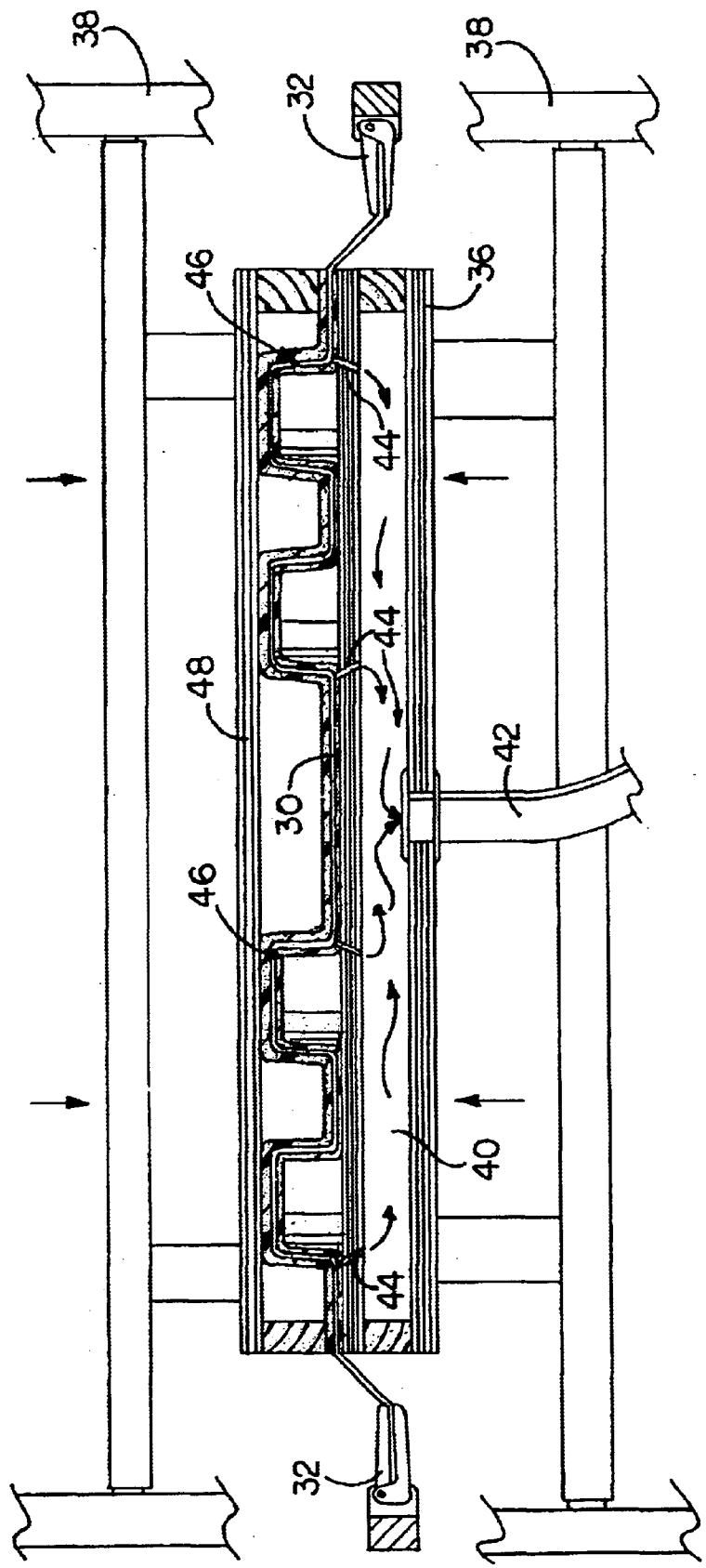
FIG. 6 is a view similar to FIGS. 4 and 5, but illustrating the platens of the press fully closed together.

Accordingly, the upper platen 48 and lower platen 36 are advanced toward one another until the outer peripheral edge 50 of the lower die member is engaged by the vinyl blank 30, as illustrated in FIG. 5, thereby forming a sealed chamber 52 between the blank 30 and the lower die members. Accordingly, suction applied through hose 42 creates a partial vacuum in the plenum 40, thereby drawing air through passages 44 as the male and female die members are brought together. At the same time, the clamps 32 are allowed to move toward one another, thereby progressively relaxing the tension on the blank 30 as the vinyl is forced into the cavities of the dies by a combination of the movement of the male die into the female die member, and by the suction applied through the passages 44. Since the relaxation of the vinyl blank 30 is controlled as the vinyl is forced into the mold, the vinyl can be formed without wrinkles or creases, since the suction applied also assures that the blank is properly drawn around the die members. As discussed above, the vinyl blank 30 is a thermal formed vinyl, so that the dies 34 and 46 are heated, thereby permanently forming the vinyl into the shape of the upper contoured vinyl member 14.

Figure 7:
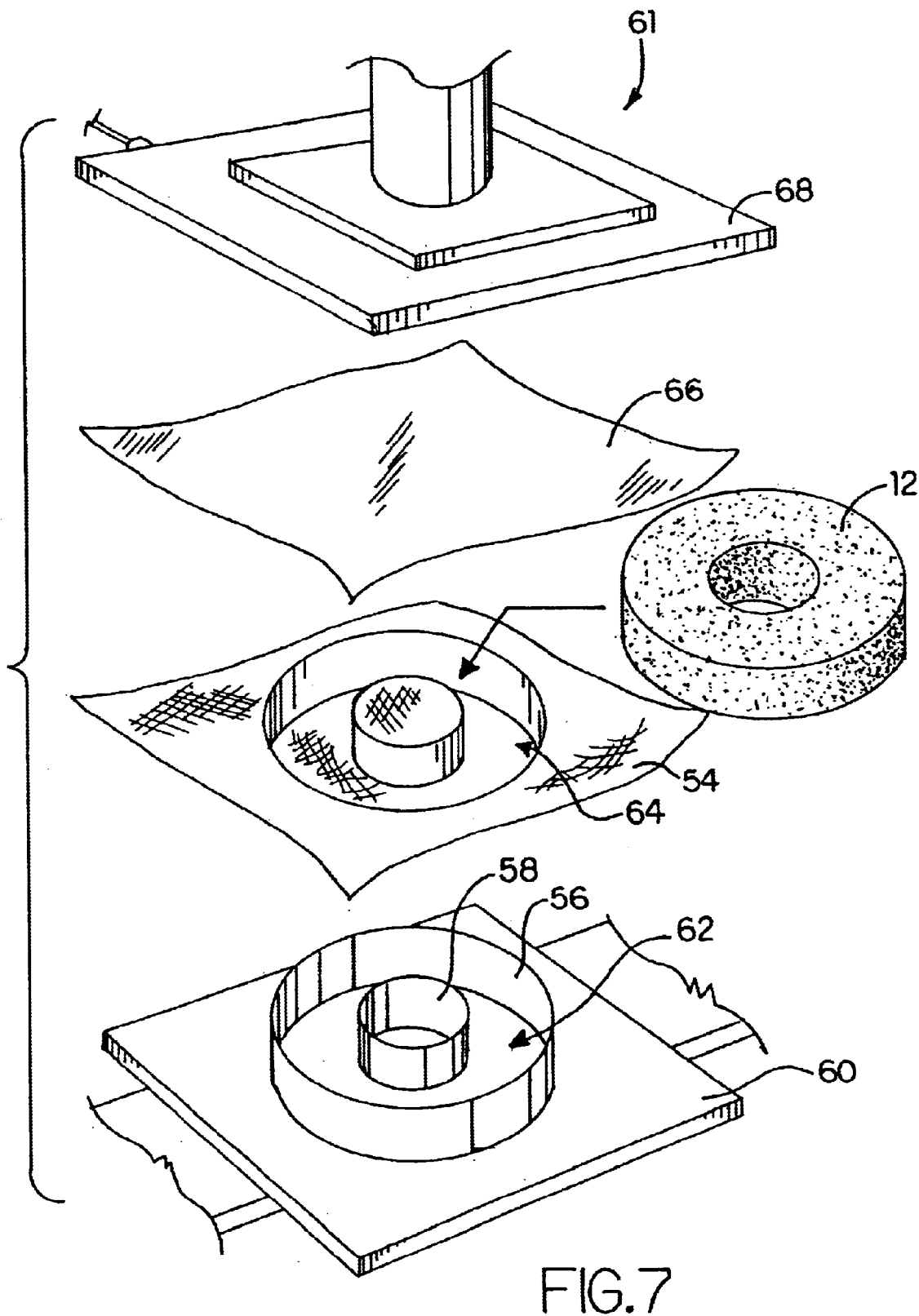
FIG. 7 is an exploded view in perspective illustrating the manner in which the surgical positioner is installed in another press for sealing the surgical vinyl around the foam rubber component.
Figure 8:
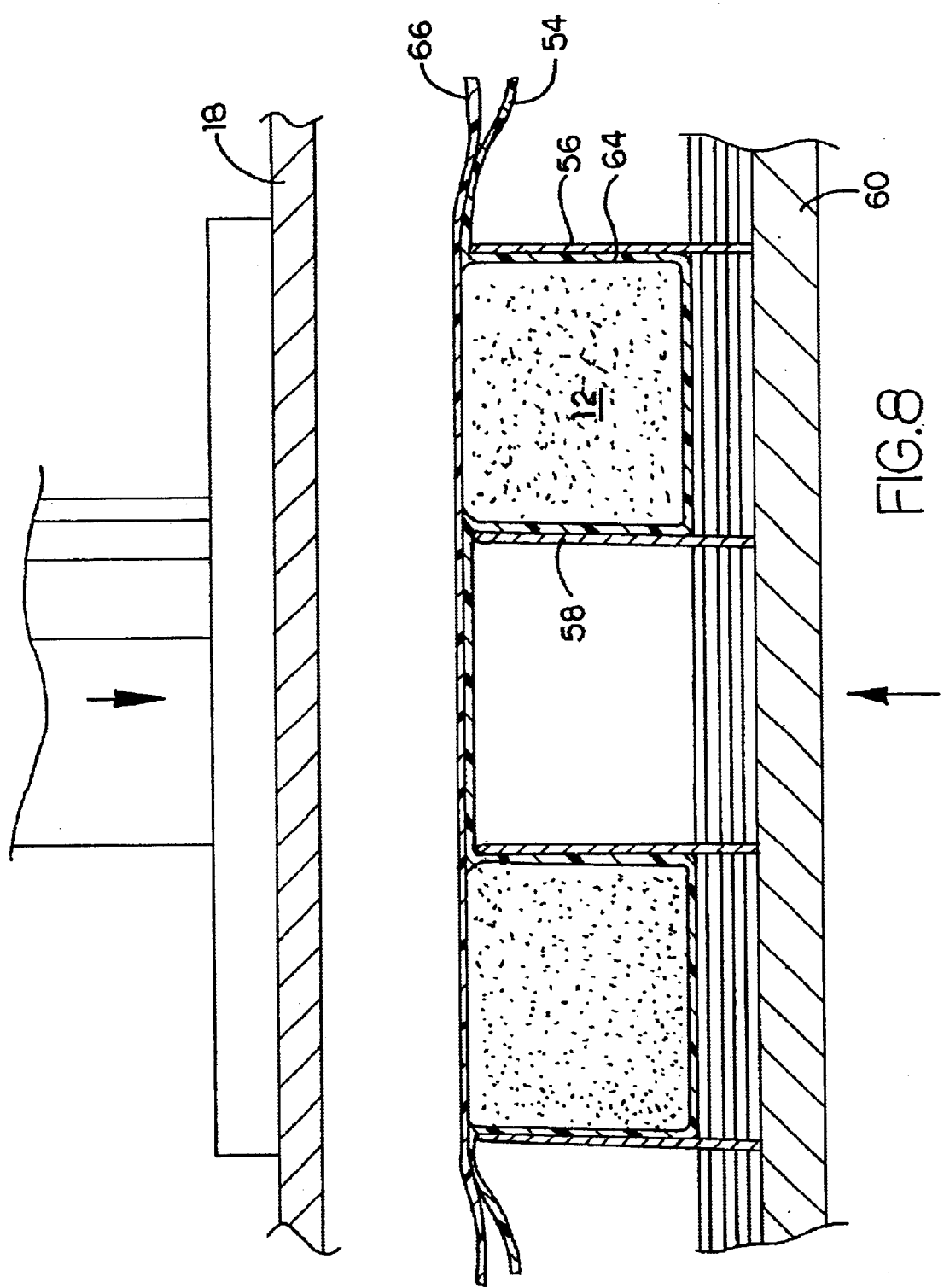
FIG. 8 is a view similar to FIG. 7 but illustrating the components installed in the press with the platens of the press open.
Figure 9:
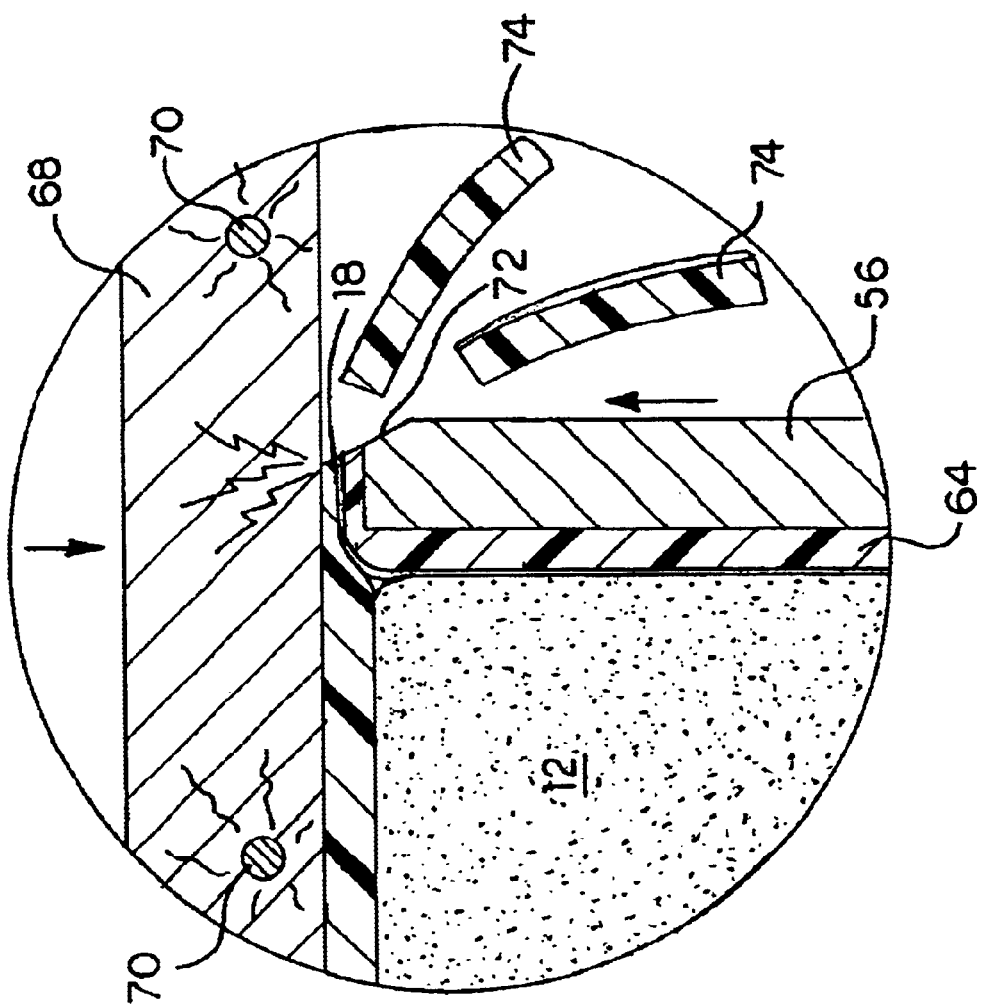
FIG. 9 is an enlargement of one of the corners of the positioner illustrating the manner in which the vinyl is sealed around the foam rubber and the edges of the vinyl are trimmed.

After the upper contoured vinyl members 14 are formed, the press is opened, the formed blank 30 is removed from the press, and the copies of the contoured member 14 are cut from the blank 30, to provide an untrimmed contour member as indicated at 54 in FIG. 7. Forming rings 56, 58 are provided in a lower platen 60 of another press generally indicated by the numeral 61. The forming rings 56, 58 define an annular volume 62 then accepts the contoured portion 64 of the untrimmed formed vinyl member 54. After the contoured portion 64 is installed in volume 62, the deformable ring 12 is placed in the contoured portion 64. Unformed sheet 66 is then laid over the untrimmed vinyl blank 54 and deformable ring 12, as clearly shown in FIG. 8. In the preferred embodiment the same stretchable material was utilized for sheet 66; however, as the second sheet does not necessarily have to be stretched, a different material may be used. The upper platen 68 and lower platen 60 are then advanced toward one another, until the upper platen 68 engages the untrimmed vinyl 66. The upper platen 68 is provided with heating elements 70 (FIG. 9), which heat the vinyl and cause the edge portions 18 to fuse together because of heating and transonic energy applied through the upper platen 68. The upper edges of the rings 56 and 58 are provided with a knife edge 72 which trims off the excess 74 of the untrimmed member 54 and sheet 66. The finished product can then be removed from between the rings 56 and 58.

Figure 10:
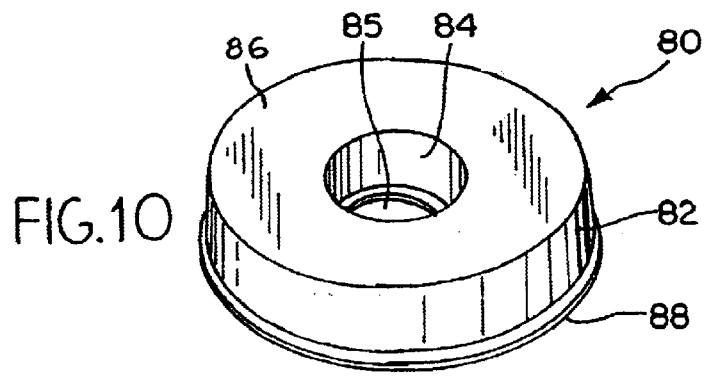
FIG. 10 is a perspective view of a surgical positioner for pediatric patient typical of the type manufactured by the process disclosed herein.

Alternate embodiments of surgical positioners embodying the inventive concept disclosed herein are illustrated in FIGS. 10–16. These embodiments are manufactured by the same process or method described for making the ring of FIG. 1. FIG. 10 shows a medical positioner generally indicated as 80 which is similar to surgical positioner 10, but is designed to protect the head of a pediatric patient and is therefore smaller. Pediatric positioner 80 includes an outer circumferential surface 82 and an inner circumferential surface 84 defining a central opening 85. Pediatric positioner 80 has the general shape of a ring and includes an upper transverse surface 86 and a lower transverse surface 88. Central opening 85 is designed to accommodate the back of a head of a pediatric patient lying in the supine position.

Figure 11:
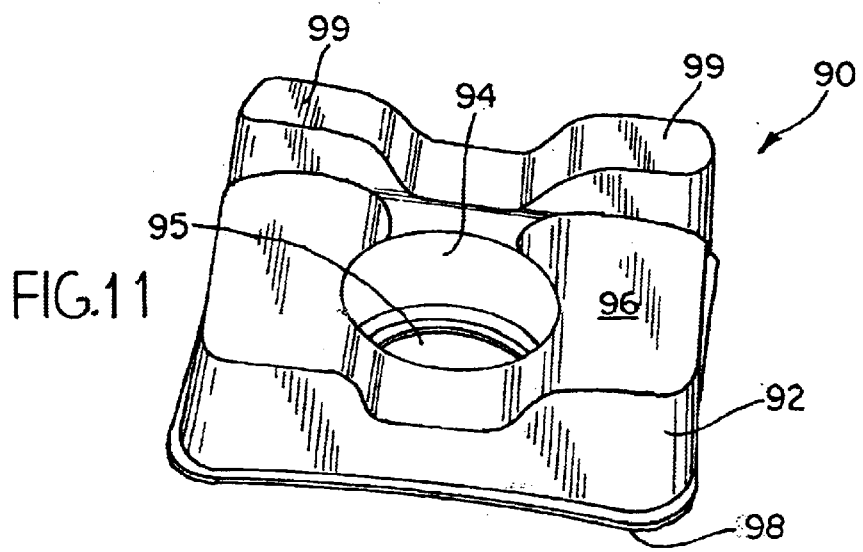
FIG. 11 is a perspective view of a head and neck surgical positioner designed for a patient in the supine position.

An alternate embodiment head and neck positioner generally indicated as 90 is shown in FIG. 11. Postioner 90 includes an outer surface 92 which may be, for example, either generally square, rectangular or cylindrical and an inner circumferential surface 94 which defines a generally central opening 95. Head and neck positioner 90 also includes an upper surface 96 and a lower transverse surface 98. Head positioner 90 further includes a neck support contour 99 for supporting the neck of a patient lying in the supine position with the back of the patient's head aligned in the central opening 95.

Figure 12:
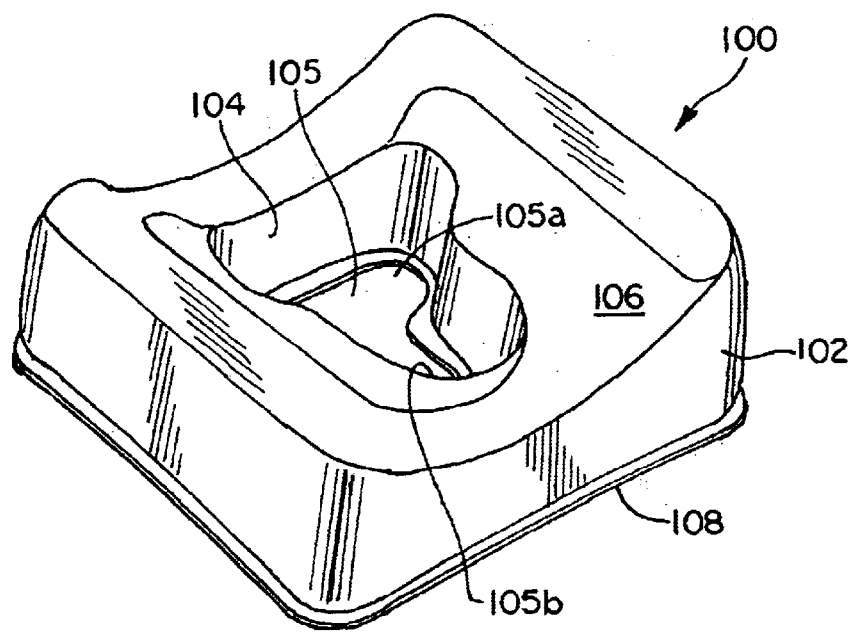
FIG. 12 is a perspective view of a slotted head and neck surgical positioner designed for the patient in the prone position.

A prone head support positioner is shown generally as 100 in FIG. 12 for supporting the head of a patient lying in a prone or face down position. Prone positioner 100 includes an outer surface 102 and an inner surface 104 defining a generally central opening or slot 105. Outer surface 102 is shown as being generally square, but as with all positioner embodiments, may be changed to any desired shape such as circular, rectangular or elliptical. In the preferred embodiment of prone positioner 100, central opening 105 has a shape similar to that of a bicycle seat having a wider portion 105a and a more narrow portion 105b. The positioner is designed so that the patient's forehead would coincide with wider portion 105a, and the patient's chin area would coincide with the more narrow portion 105b. Prone head positioner 100 also includes an upper surface 106 preferably having a concaved profile to more readily conform to the patient's face and a flat lower transverse surface 108.

Figure 13:
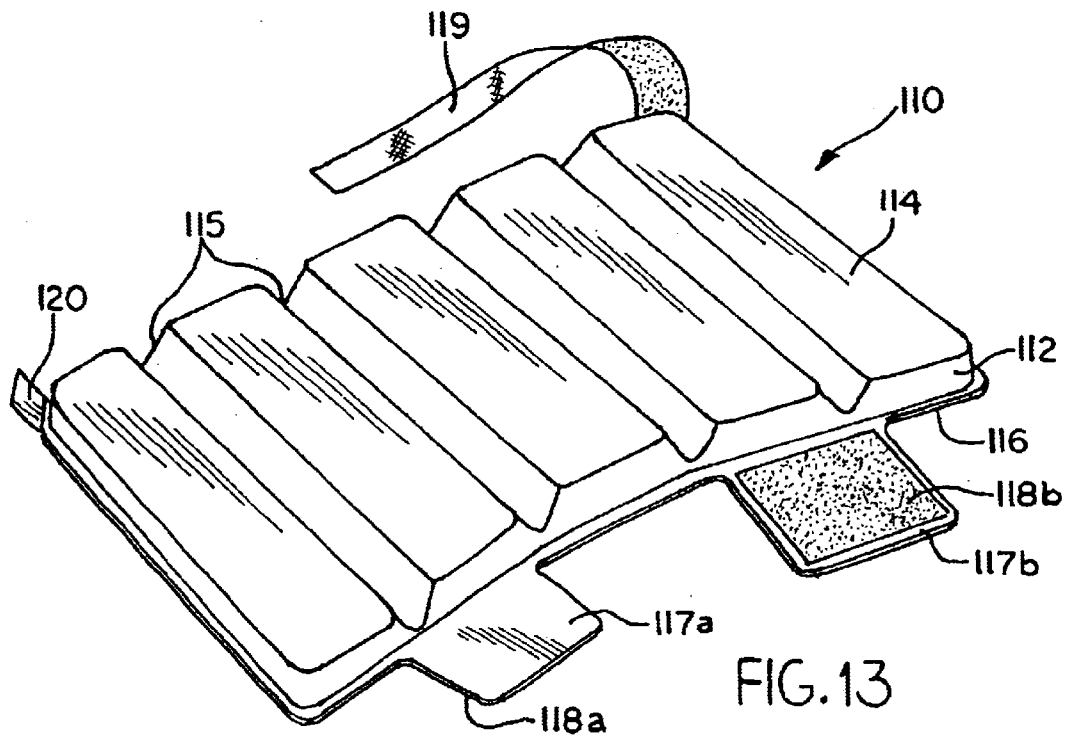
FIG. 13 is a perspective view of a surgical positioner for protecting the foot and heel of a patient.

Now referring to FIGS. 13, and 13A–C, a foot and heel positioner is generally indicated as 110. In the preferred embodiment, the foot and heel positioner has a generally rectangular shape having an outer surface 112 and an upper surface 114 defining a multiplicity of grooves 115 running generally parallel to one another and transverse to the length of foot and heel positioner 110. Positioner 110 also includes a lower transverse surface 116. Along one side of positioner 110 is a pair of tabs 117a, 117b. As shown in FIG. 13, tab 117a has either hook or loop material attached to the bottom side thereof while tab 117b has the mating hook or loop material 118b to mate and fasten to material 118a. Tabs 117a, 117b are preferably an extension of the covering material wrapped about the cushioning material within positioner 110. The hook and loop material 118a, 118b are preferably attached to respective tabs 117a, 117b using adhesive or stitching. On the side of positioner 110 opposite tabs 117a, 117b and preferably at the corners of the positioner are a hook and loop strap 119 and a mating hook or loop tab 120. As with tabs 117a, 117b, one of either strap 119 and tab 120 carries a hook material while the other carries the mating loop material so that strap 119 may be fastened to tab 120.

The purpose of the grooves 115 is to increase the bending flexibility of positioner 110 so as to be able to bend the positioner to conform around the foot and heel of a patient as shown in FIGS. 13A–C. In FIG. 13A, the foot and heel positioner is illustrated from an end view as bent about grooves 115 and secured by the hook and loop material on tabs 117a, 117b as well as strap 119 and tab 120. The foot and heel positioner is depicted in FIGS. 13B and 13C showing two different manners of securing the positioner about a foot 122. In FIG. 13B, positioner 110 is wrapped around the heel and ankle of the patient. Strap 119 is placed about the upper portion of a patient's ankle while tabs 117a, 117b are fastened and located adjacent the bottom rear portion of foot 122. In FIG. 13C, positioner 110 is shown wrapped about the bottom and side portions of foot 122. Strap 119 is placed over the top front portion of the foot while tabs 117a, 117b are fastened behind the heel portion 124 of the patient's foot and secured to one another with the hook and loop material.

Figure 14:
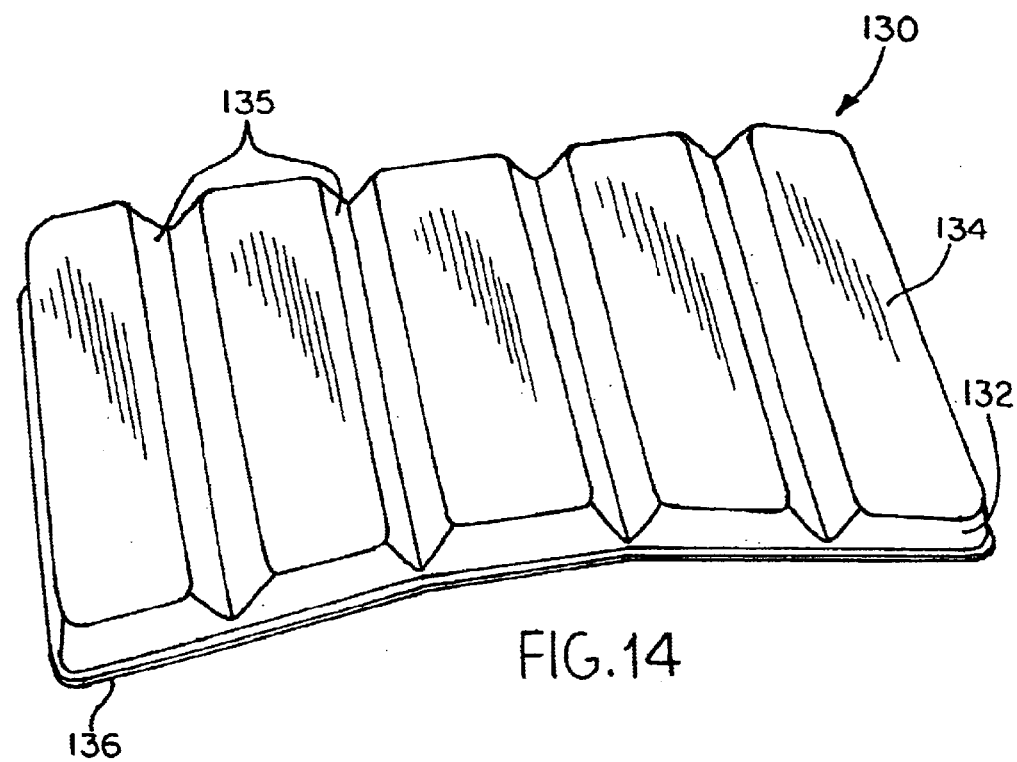
FIG. 14 is a perspective view of a universal pad surgical positioner.

A universal pad medical positioner generally indicated as 130 is shown in FIG. 14. In the preferred embodiment, the universal pad has a generally rectangular shape defined by outer surface 132. Universal pad positioner 130 also includes an upper surface 134, defining generally parallel transverse grooves 135, and a lower transverse surface 136. Universal pad positioner 130 can be placed anywhere beneath the patient where it is desire to provide a cushioning effect such as beneath the shoulders, back, buttocks or chest of the patient. As with foot and heel positioner 110, grooves 135 in universal pad positioner 130 provide increased flexibility and cushioning of the pad.

Figure 15:
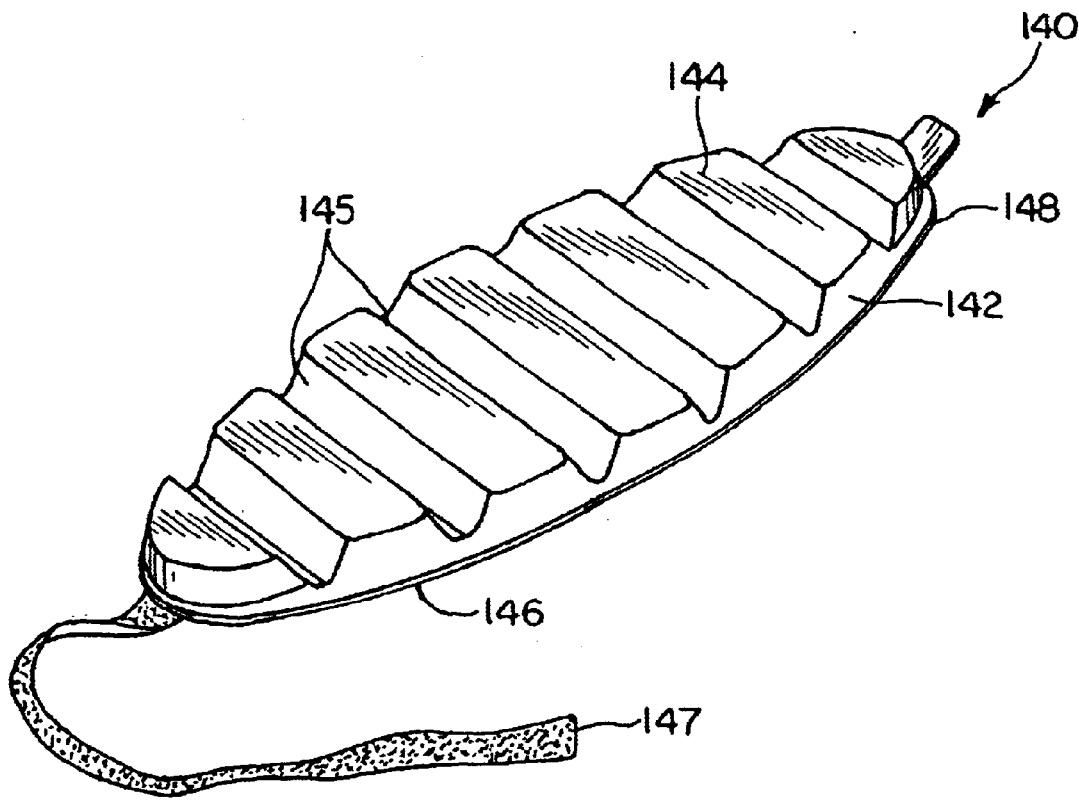
FIG. 15 is a perspective view of a surgical positioner designed to protect the ulnar nerve of a patient.

In FIG. 15, an ulnar nerve protector medical positioner is generally indicated as 140 which has a generally elliptical shape defined by outer surface 142. Ulnar protector positioner 140 also includes an upper surface 144, which defines transversly extending and generally parallel grooves 145, and a lower transverse surface 146. A hook or loop strap 147 is attached at one end of ulnar protector positioner 140 and at the opposite end 148 of the positioner, the mating hook or loop material to strap 147 is attached to bottom surface 146. Of course, a tab similar to 120 may also be attached to end 148 and the hook or loop material affixed thereto. As with foot and heel positioner 11, grooves 145 increase the flexibility and allow ulnar protector positioner 140 to be srapped about the elbow and forearm of a patient. The positioner can then be secured by fastening strap 147 to the hook or loop material at end 148.

Figure 16:
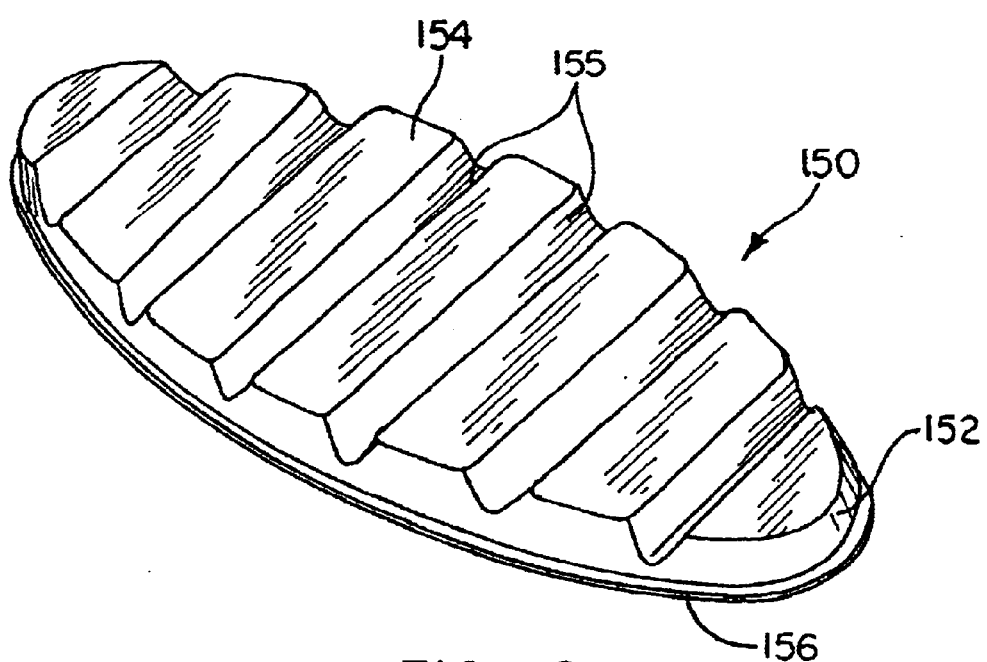
FIG. 16 is a perspective view of a surgical positioner designed to protect the arm or leg of a patient.

In FIG. 16, an arm or leg pad positioner is generally indicated as 150. Positioner 150 is similar to ulnar protector positioner 140 except that it does not have an attached strap or hook and loop material. Positioner 150 has a generally elliptical shape defined by an outer surface 152 and an upper surface 154 defining transverse generally parallel grooves 155. A lower transverse surface is designated as 156.

While the invention has been taught with specific reference to the above embodiments and some variations have been suggested above, one skilled in the art will recognize that other changes can be made in form and detail without departing from the spirit and scope of the invention. For example, instead of the hook and loop fasteners that are shown attached to some of the embodiments, separate, disposable hook and loop straps and/or fasteners may be used to wrap around any of the positioners for securing the same about the body part of the patient. It would also be possible to substitute the hook and loop fasteners with straps and buckles, snaps or any other well known fastening means. One could also replace the openings shown in the various embodiments of head positioners with a partial opening or recessed area. The shape of the area contoured to support the head may also be varied. Furthermore, the shape, spacing, or orientation of the transverse grooves may be varied as desired. Also, the universal pad positioner 130 or any of the other pads may be molded to more comfortably assume a particular body part shape such as shoulders, chest or buttocks. As such, the described embodiments are to be considered in all respects as illustrative and not restrictive. The scope of the invention is, therefore, indicated by the independent claims rather than by the description.

What is claimed is:

1. A medical positioner comprising a mass of deformable material shaped into a desired configuration for protecting a body part of a patient, and a stretchable material or overlay covering said mass of deformable material, said stretchable material or overlay having an antibacterial agent added and including a first layer and a second layer, said first layer being thermally deformed, stretched, and contoured in the same shape as the mass of deformable material whereby the first layer presents a non-gathered surface to minimize areas for bacterial growth, and said first layer fits over a first portion of said mass of deformable material, said second layer covering a second portion of said mass of deformable material not covered by the first layer, said first and second layers defining edges secured together by a seam which is resistant to bacterial penetration and whereby said first and second layers cover said mass of deformable material.

2. The medical positioner as claimed in claim 1, wherein said mass of deformable material is shaped in a ring and said first layer includes a transverse section covering a transverse surface of said ring and inner and outer circumferentially extending sections extending over inner and outer circumferentially extending surfaces of said ring.

3. The medical positioner as claimed in claim 1, wherein said second layer covers a transverse surface of said mass of deformable material and is secured to said first layer at a peripheral edge of said transverse surface.

4. The medical positioner as claimed in claim 3, wherein said second layer is substantially flat.

5. The medical positioner as claimed in claim 1, wherein the mass of deformable material is configured to support the head of a patient lying in the supine position.

6. The medical positioner as claimed in claim 5, the deformable material is also configured to support the neck of a patient lying in the supine position.

7. The medical positioner as claimed in claim 1, wherein said mass of deformable material is configured to support the head of a patient lying in a prone position.

8. The medical positioner as claimed in claim 7, further comprising a slot or recess of varying width.

9. The medical positioner as claimed in claim 1, further comprising grooves for increasing the flexibility of said medical positioner to conform about a body part of the patient.

10. The medical positioner as claimed in claim 1, further comprising a fastening mechanism to hold the positioner in place as it is wrapped about a body part.

11. The medical positioner as claimed in claim 10, wherein the fastening mechanism includes hook and loop material attached to tabs extending from said positioner.

12. The medical positioner as claimed in claim 10, wherein the fastening mechanism includes a strap.

13. The medical positioner as claimed in claim 1, wherein the first layer consists of vinyl material.

14. The medical positioner as claimed in claim 1, wherein the mass of deformable material consists of polyurethene foam.

15. A medical positioner comprising a mass of deformable material shaped into a desired configuration for protecting a body part of a patient and an overlay surrounding said mass of deformable material, said overlay including a first layer and a second layer, said first layer comprising a stretchable material being thermally deformed, stretched, and permanently contoured in the same shape as the mass of deformable material whereby the first layer presents a non-gathered surface to over a first portion of said mass of deformable material, said second layer covering a second portion of said mass of deformable material not covered by said first layer, said first and second layers being secured together to cover said mass of deformable material.

16. The medical positioner as claimed in claim 15, wherein the first layer includes a heat sealable vinyl.

17. The medical positioner as claimed in claim 15, further comprising a fastening mechanism to hold the positioner in place as it is wrapped about a body part.

18. A medical positioner comprising a mass of antibacterially treated deformable material permanently shaped into a desired configuration a body part; an overlay of material covering said mass of deformable material said overlay permanently contoured in the same shape as the mass of deformable material to present a non-gathered surface to minimize areas for bacterial growth said overlay sealed by a seam which is resistant to bacterial penetration; and grooves for increasing the flexibility of said medical positioner for wrapping about the body part of the patient.

19. The medical positioner as claimed in claim 18, further including a fastening mechanism for holding the medical positioner in place as it is wrapped about a body part.

20. The medical positioner as claimed in claim 18, wherein the overlay includes a first layer and second layer of heat sealable stretchable material.

* * * * *

UNITED STATES PATENT AND TRADEMARK OFFICE
CERTIFICATE OF CORRECTION

PATENT NO. : 6,625,831 B2
DATED : September 30, 2003
INVENTOR(S) : Kevin Laughlin It is certified that error appears in the above-identified patent and that said Letters Patent is hereby corrected as shown below:

<u>Column 7,</u>
Line 16, after the words "surface to" please add -- minimize areas for bacterial growth, and said first layer fits --

Signed and Sealed this

Twenty-seventh Day of January, 2004

JON W. DUDAS
*Acting Director of the United States Patent and Trademark Office*